(12) United States Patent
Rafler et al.

(10) Patent No.: US 8,733,699 B2
(45) Date of Patent: May 27, 2014

(54) OVERHEAD LUGGAGE COMPARTMENT

(75) Inventors: Markus Rafler, Ichenhausen (DE); Michael Klas, Mietingen (DE); Dietmar Stroebele, Stetten (DE)

(73) Assignee: Diehl Aircabin GmbH, Laupheim (DE)

( * ) Notice: Subject to any disclaimer, the term of this patent is extended or adjusted under 35 U.S.C. 154(b) by 340 days.

(21) Appl. No.: 13/207,932

(22) Filed: Aug. 11, 2011

(65) Prior Publication Data

US 2012/0038253 A1 Feb. 16, 2012

(30) Foreign Application Priority Data

Aug. 11, 2010 (DE) .......................... 10 2010 034 027

(51) Int. Cl.
*B64C 1/20* (2006.01)
*B64C 1/22* (2006.01)
*B64D 47/00* (2006.01)

(52) U.S. Cl.
USPC ...................................... 244/118.1

(58) Field of Classification Search
USPC ................................... 244/117, 118.1, 118.5
See application file for complete search history.

(56) References Cited

U.S. PATENT DOCUMENTS 3,700,199 A 10/1972 Matuska
2008/0078871 A1 4/2008 Munson et al.

FOREIGN PATENT DOCUMENTS

DE 601 04 358 T2 12/2013

*Primary Examiner* — Valentina Xavier
(74) *Attorney, Agent, or Firm* — Scully, Scott, Murphy & Presser, P.C.

(57) ABSTRACT

An overhead luggage compartment for a vehicle cabin is provided. In the compartment, a ledge provided with an electrical component is pivotably held in a housing half-shell about a pivot axis. The pivot axis extends through two axles connecting the ledge to the housing half-shell. For connecting the electrical component to a cable, one of the axles has a through-hole extending in the axial direction, through which the cable is guided for connecting the component.

9 Claims, 5 Drawing Sheets

OVERHEAD LUGGAGE COMPARTMENT

BACKGROUND

The invention relates to an overhead luggage compartment according to the preamble of claim 1.

Such an overhead luggage compartment is disclosed in US 2008/0078871 A1. In the known overhead luggage compartment, power is supplied to an electrical component provided on a ledge via two pivot bearings, with which the ledge is pivotably held on a housing. To this end, each of the pivot bearings has a bearing bush provided on the housing and produced from metal, and which is electrically connected via a sliding contact to a further bearing bush provided on the ledge. A cable leads from the further bearing bush to the electrical component and forms a terminal of the electrical connection. A second terminal of the electrical connection is formed by a corresponding design of the second pivot bearing. The known power supply system is costly to produce. In particular, the provision of bearing bushes produced from metal and further bearing bushes and sliding contacts require a high production cost. Such parts are heavy which is undesirable, in particular, when producing overhead luggage compartments for aircraft. In addition, only one electrical cable may be connected to the known arrangement via each pivot bearing into the interior of the ledge.

It is the object of the invention to remedy the drawbacks of the prior art. In particular, an overhead luggage compartment is intended to be provided in which an electrical component received in a ledge may be easily, rapidly and cost-effectively connected to a power supply cable and/or control cable.

SUMMARY

According to the invention, it is provided that one of the axles has a through-hole extending in the axial direction, through which the cable is guided for connecting to the component. The proposed, surprisingly easy passage of the cable through a through-hole of an axle extending in the axial direction reduces the production cost and permits a connection of more than two cables to an electrical component provided in the ledge. In order to produce an electrical connection to the electrical component, in contrast to the prior art, it is no longer necessary to produce bearing bushes made of metal or to produce a sliding contact therebetween. The invention permits the production of the bearing arrangement which is made of lightweight plastics material and comprises the bearing bushes. Apart from this, the invention—in contrast to the prior art—permits complete electrical insulation of current-carrying elements. The proposed overhead luggage compartment is robust, lightweight and, in particular, is suitable for use in watercraft, land vehicles or aircraft, in particular, passenger aircraft.

According to an advantageous embodiment, one axle is configured as an axle bush. Such an axle bush may be inserted into an opposing through-hole of a housing half-shell side wall, after the insertion of the ledge, from the inner side wall thereof through a through-hole provided therein.

According to an advantageous embodiment, the axle bush engages in a first axle bearing bush attached to a housing half-shell side wall and/or in a second axle bearing bush attached to a ledge side wall. Such axle bearing bushes may be produced, for example, from plastics material. Thus, in a simple manner, an increased bearing surface for the axle bush may be provided and predetermined tolerances between the axle bush and the axle bearing bushes may be adjusted. The axle bearing bushes may be adhesively bonded, welded, screwed or riveted to the side walls of the ledge and/or the housing half-shell.

According to a further advantageous embodiment, an axle bearing comprising the axle bush and the first axle bearing bush and/or second axle bearing bush is configured as a loose bearing. In other words, the ledge is movable in the axial direction relative to the housing half-shell. Thus, for example, in the case of deformation of the housing half-shell, damage may be avoided to the pivotable bearing arrangement of the ledge in the housing half-shell. Such a deformation may occur, in particular, with the use of the proposed overhead luggage compartment in a vehicle cabin, in particular an aircraft cabin. In the case of the provision of one axle bearing as a loose bearing, expediently the other axle bearing may be designed as a fixed bearing. Thus undesirable rattling of the ledge inside the housing half-shell may be avoided.

Advantageously, the cable is guided on the outer face of the housing half-shell side wall in the vicinity of the first axle bearing bush, through a groove which is formed by two guide pulleys opposing one another. The guide pulleys permit, on the one hand, a rolling guidance of the cable and, on the other hand, ensure the fixing thereof in the groove. Expediently, one of the two guide pulleys is formed relative to its axis from a lower half roller and an upper half roller releasably connected thereto. By dismantling the upper half roller it is possible to insert the cable between the lower half roller and the opposing further guide pulley, and by a subsequent connection of the upper half roller to the lower half roller it is possible to produce the groove holding the cable between the guide pulleys.

According to a further advantageous embodiment, the cable is guided below a cable cover provided on the outer face of the housing half-shell side wall, which permits the formation of a loop. The cable cover is expediently formed in the form of a further wall partially overlapping the housing half-shell side wall. A slot formed between the further wall and the housing half-shell side wall has a slot width which is slightly larger than an external diameter of the cable. The proposed design of the cable cover permits the formation of a loop therein and thus the lengthening of the cable by pulling the cable out of the cable cover.

According to a further particularly advantageous embodiment, a plug holder which may be inserted into the first axle bearing bush from the outside of the housing half-shell side wall is provided in which, for assembly purposes, a plug attached to the cable is clampingly held so that it may be pulled through the axle bush into the ledge. This considerably simplifies the assembly of the ledge. For assembly, the ledge only has to be inserted into the housing half-shell, and by inserting the axle bushes a pivotable connection is produced. Thus plugs clampingly held in the plug holder may be gripped from the inside of the ledge through the axle bearing bush, and pulled into the ledge. Thus the cable is guided about the guide pulleys. A loop located below the cable cover is stretched and thus provides an additional length of cable.

Expediently, the electrical component is a plug socket provided on a base of the ledge and corresponding to the plug. By simply inserting the plug in the plug socket an electrical connection of the cable may be made to at least one electrical device provided on the ledge. For example, a lighting means may be mounted on the ledge, preferably in a handle, said lighting means being electrically connected to the plug socket. Moreover, electrical devices may be provided such as an electromagnetic locking of the ledge, an electrical drive for opening and closing the ledge, sensors for measuring a load or the like received in the tipping device.

It has also proved expedient that a further cable cover is provided for covering a cable portion extending on an inner face of the ledge side wall as far as the plug socket. The further cable cover is preferably designed so that in the inserted state it corresponds at least partially to the contour of the inside of the ledge, i.e. by means of the further cable cover no awkward overhangs or the like are formed on the inside of the ledge.

BRIEF DESCRIPTION OF THE DRAWINGS

An exemplary embodiment of the invention is described in more detail hereinafter with reference to the drawings, in which.

DETAILED DESCRIPTION OF EXEMPLARY EMBODIMENTS

Figure 1:
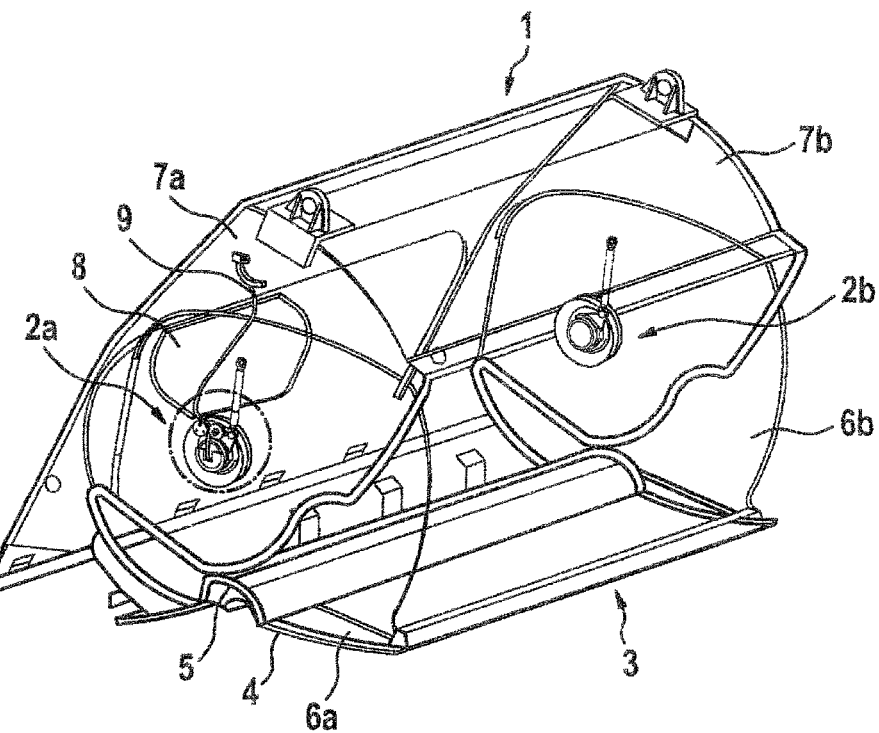
FIG. 1 shows a perspective view of an overhead luggage compartment.
Figure 2:
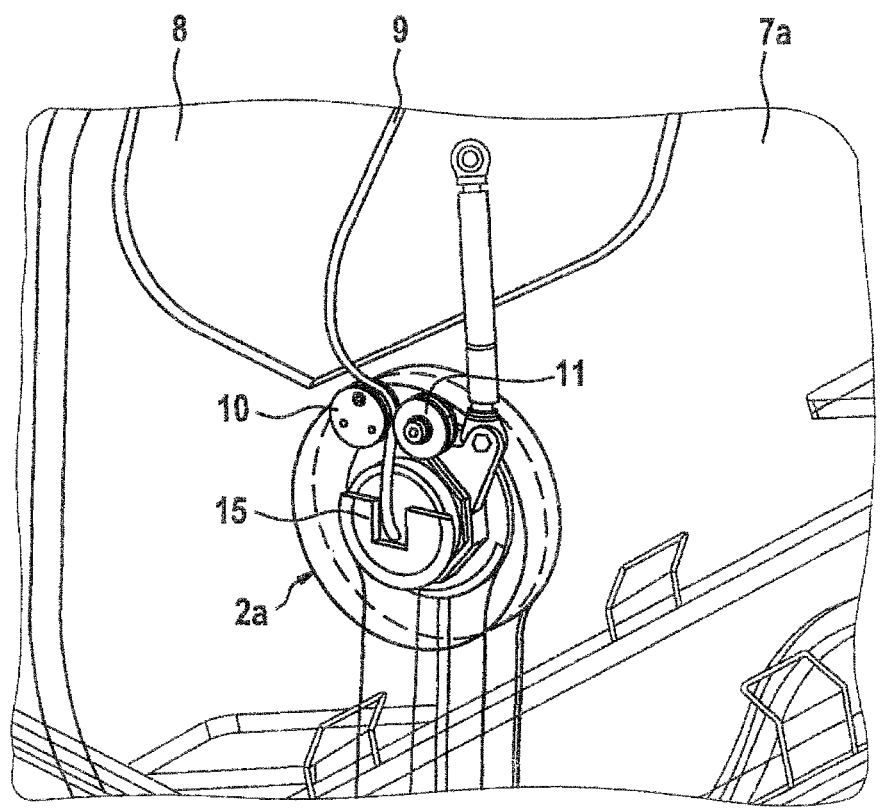
FIG. 2 shows a detailed view according to FIG. 1.

The overhead luggage compartment shown in the figures has a housing half-shell 1, in which a ledge 3 is pivotably held about two axle bearings 2a, 2b. A handle 5 with a gripping recess located therebehind is positioned on a curved front wall 4 of the ledge 3. Ledge side walls 6a, 6b extend from the front wall 4. The housing half-shell 1 has housing half-shell side walls 7a, 7b opposing the ledge side walls 6a, 6b.

A cable cover 8 designed in the manner of a double wall is provided on a first housing half-shell side wall 7a. A cable 9 is laid in a slot formed between the cable cover 8 and the first housing half-shell side wall 7a. The cable 9 is guided through two opposing guide pulleys 10, 11 and through the first axle bearing 2a into the inside of the ledge 3.

Figure 3:
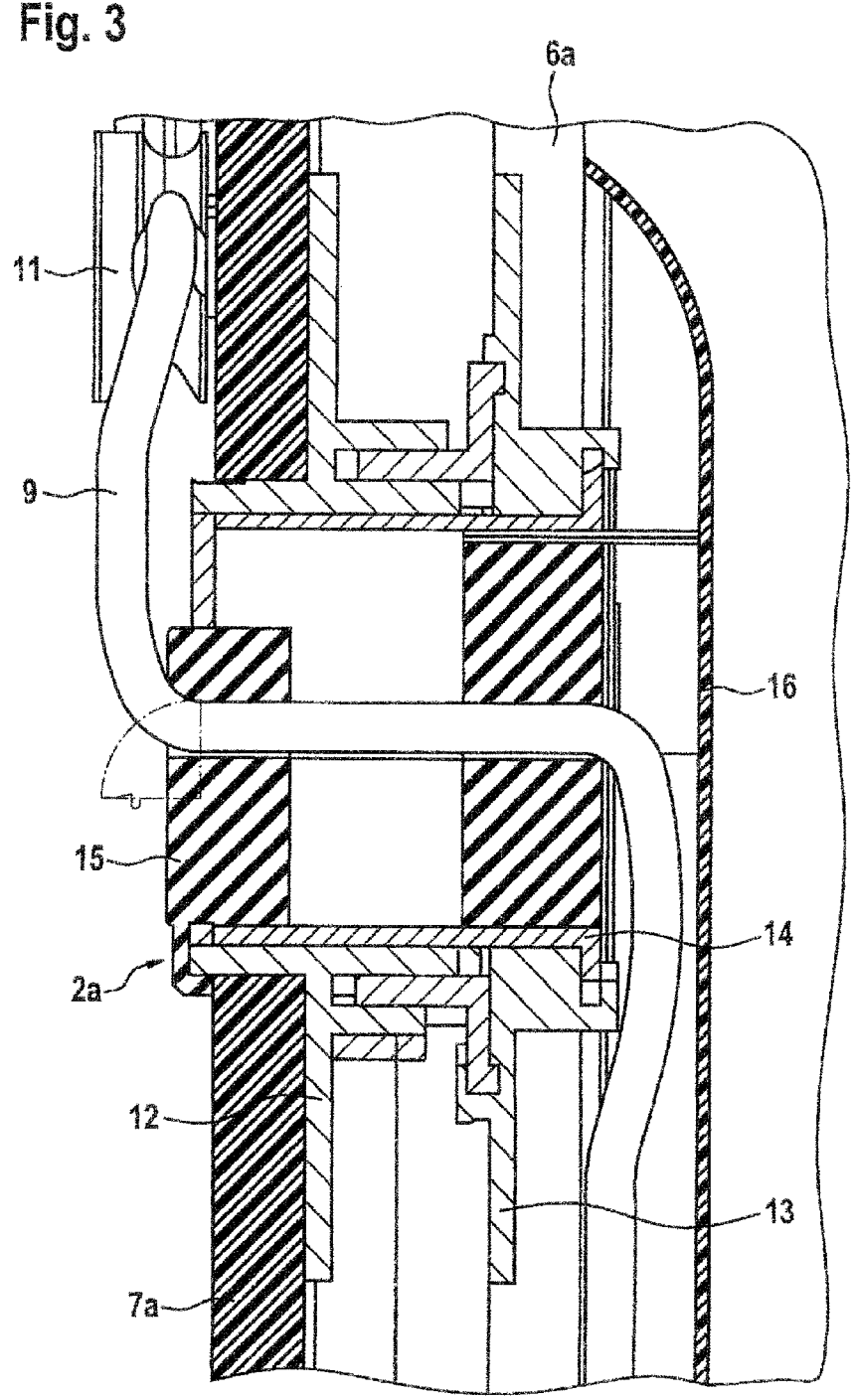
FIG. 3 shows a sectional view through the loose bearing according to FIG. 1.

FIG. 3 shows a sectional view through the first axle bearing 2a. A first axle bearing bush 12 is attached, for example, by means of an adhesive connection to the first housing half-shell side wall 7a. A second axle bearing bush 13 is attached, for example, by means of an adhesive connection to the first ledge side wall 6a. An axle bush is denoted by the reference numeral 14, which bears with a flange attached thereto against the second axle bearing bush 13 and extends from the second axle bearing bush 13 to the first axle bearing bush 12. The axle bush 14 is secured on the second axle bearing bush 13 by means of a latching lug, a circlip or the like. A plug holder inserted in the first axle bearing bush 12 is denoted by the reference numeral 15. A further cable cover 16 is also attached to an inner face of the first ledge side wall 6a.

Figure 4:
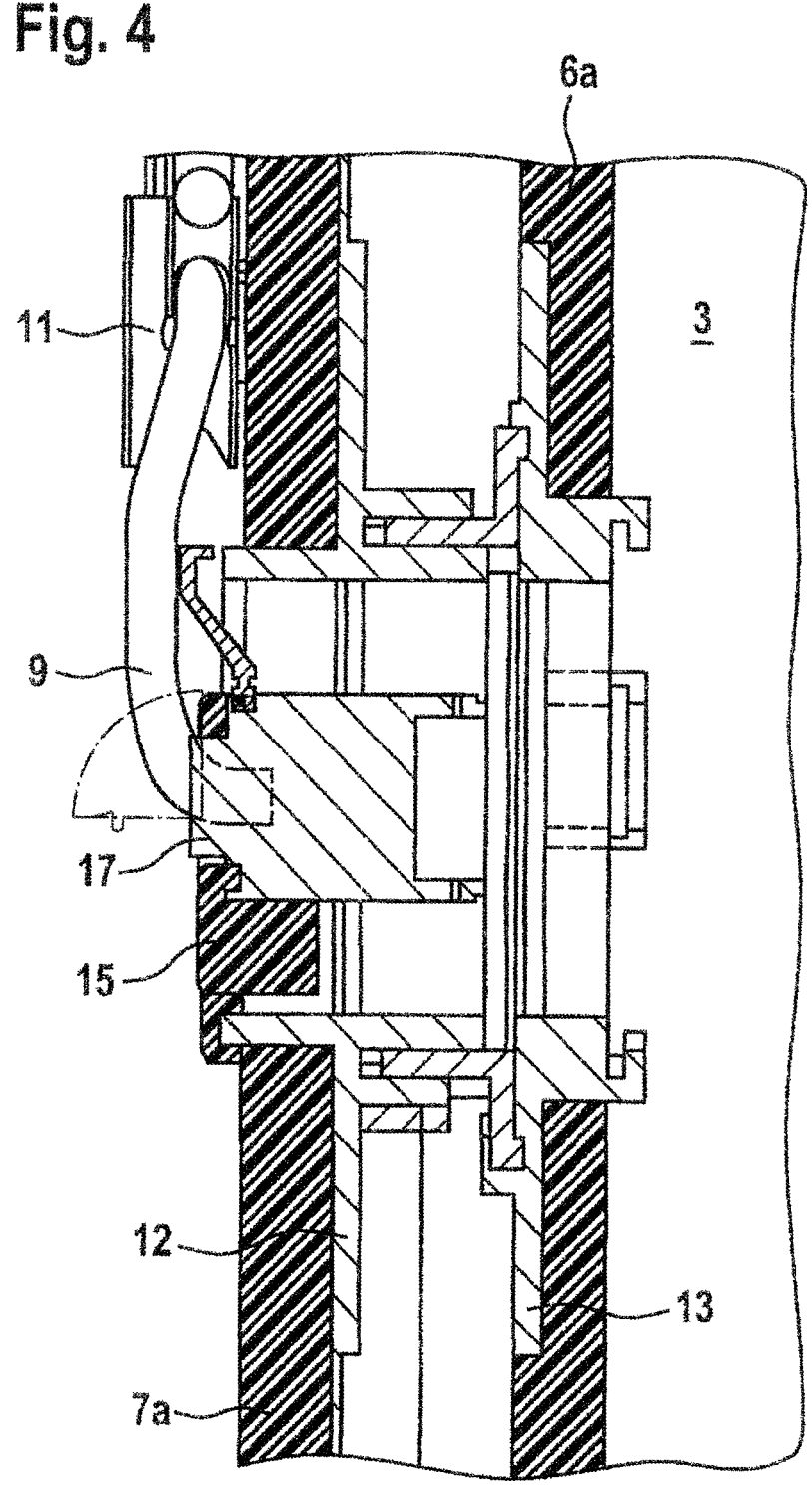
FIG. 4 shows a further sectional view through the loose bearing according to FIG. 1 with the plug held therein.

FIG. 4 shows an assembled state before the axle bush 14 has been inserted for producing the first axle bearing 2a. In this case, a plug 17 attached to the cable 9 is clampingly held in the plug holder 15 so that it may be pulled through the second axle bearing bush 13 into the interior of the ledge 3. Thus the axle bush 14 may then be mounted.

Figure 5:
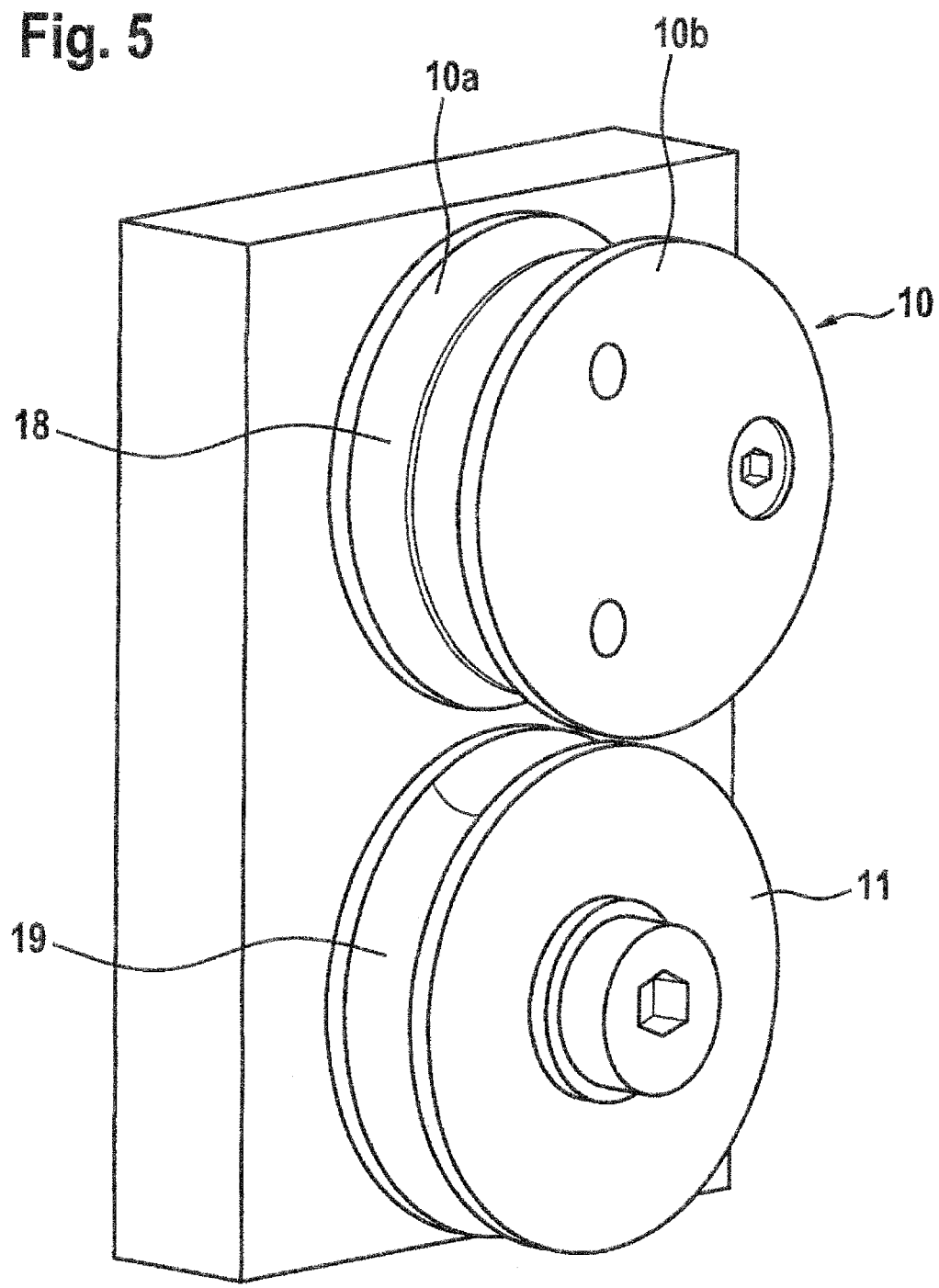
FIG. 5 shows a perspective detailed view of the guide pulleys.

FIG. 5 shows a perspective detailed view of the guide pulleys 10, 11. A first guide pulley 10 consists of a lower half roller 10a and an upper half roller 10b connected releasably thereto, for example by means of a screw connection. In the assembled state, the lower half roller 10a and upper half roller 10b form the first guide pulley 10 with a first peripheral groove 18 provided thereon. The opposingly arranged second guide pulley 11 has a second groove 19. For passing the cable 9 (not shown here) through a guide channel formed by the first groove 18 and the second groove 19, the upper half roller 10b may be dismantled, the cable 9 inserted into the second groove 19 and then the upper half roller 10b mounted again.

Figure 6:
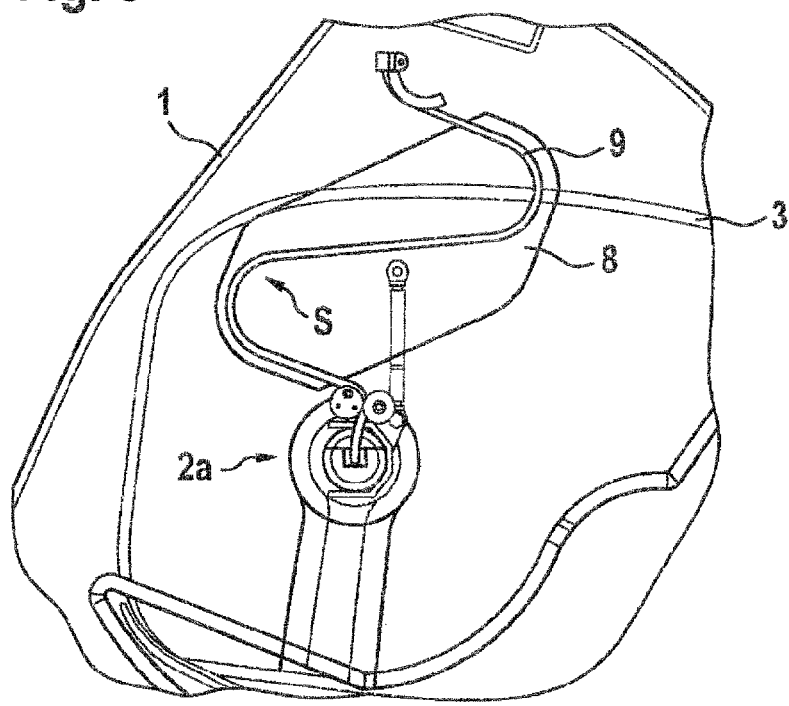
FIG. 6 shows a side view of the first housing half-shell side wall before the connection of the cable and FIG. 7 shows a view according to FIG. 6 after the connection of the cable.
Figure 7:
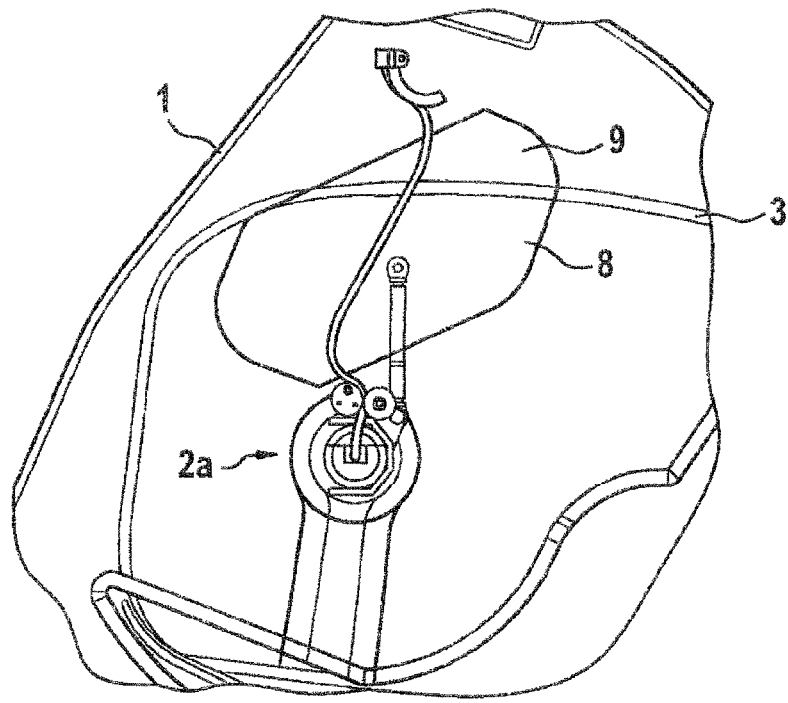

FIGS. 6 and 7 show the mounting of the ledge 3 onto the housing half-shell 1. The housing half-shell 1 is prefabricated as a mounting unit such that the plug 17—as shown in FIG. 4—is clampingly held in the plug holder 15. The cable 9 forms a loop S below the first cable cover 8. For the mounting of the ledge 3, said ledge only has to be inserted into the thus preassembled housing half-shell 1. As soon as the first axle bearing bush 12 and the second axle bearing bush 13 are approximately aligned, the plug 17 may be gripped from the inside of the ledge 3, and pulled into the interior of the ledge 3. Subsequently, by inserting the axle bush 14 a pivotable connection may be produced between the ledge 3 and the housing half-shell 1. After connecting the plug 17 to a plug socket (not shown here) the further cable cover 16 is attached to the inside of the ledge 3.

FIG. 7 also shows schematically the assembled state. In this case, the cable 9 is in a substantially stretched state. An additional cable portion provided by the loop S is now located inside the ledge 3.

The guide pulleys 10, 11 provided in the vicinity of the first axle bearing bush 12 ensure a substantially friction-free rolling guidance of the cable 9 during assembly. After assembly, the guide pulleys 10, 11 serve for holding the cable 9 on an outer face of the first housing half-shell side wall 7a.

LIST OF REFERENCE NUMERALS

1 Housing half-shell
2a, 2b Axle bearing
3 Ledge
4 Front wall
5 Handle
6a, 6b Ledge side wall
7a, 7b Housing half-shell side wall
8 Cable cover
9 Cable
10 First guide pulley
10a Lower half roller
10b Upper half roller
11 Second guide pulley
12 First axle bearing bush
13 Second axle bearing bush
14 Axle bush
15 Plug holder
16 Further cable cover
17 Plug
S Loop

The invention claimed is:

1. An overhead luggage compartment for a vehicle cabin, comprising:
a ledge, having an electrical component, pivotably held in a housing half-shell about a pivot axis,
the pivot axis extending through two axles connecting the ledge to the housing half-shell,
wherein one of the axles has a through-hole extending in the axial direction, through which a cable is guided for connecting the electrical component,
wherein one axle is configured as an axle bush engaging in a first axle bearing bush attached to a side wall of the housing half-shell and/or a second axle bearing bush attached to a ledge side wall, and wherein the cable is guided on the outer face of the side wall of the housing half-shell in the vicinity of the first axle bearing bush through a groove formed by two guide pulleys opposing one another.

2. The overhead luggage compartment according to claim 1, wherein the axle bush and the first axle bearing bush and/or the second axle bearing bush forms an axle bearing that is configured as a loose bearing.

3. The overhead luggage compartment according to claim 1, wherein one of the two guide pulleys is formed from a lower half roller and an upper half roller releasably connected to the lower half roller.

4. The overhead luggage compartment according to claim 1, wherein the cable is guided under a cable cover on the outer face of the housing half-shell side wall, which permits the formation of a loop.

5. The overhead luggage compartment according to claim 1, further comprising a plug holder, which is inserted into the first axle bearing bush from the outside of the housing half-shell side wall, wherein for assembly purposes a plug attached to the cable is clampingly held in the plug holder, such that the plug may be pulled through the axle bush into the ledge.

6. The overhead luggage compartment according to claim 5, wherein the electrical component comprises a plug socket provided on a base of the ledge and corresponding to the plug.

7. The overhead luggage compartment according to claim 6, further comprising lighting means mounted on the ledge and electrically connected to the plug socket.

8. The overhead luggage compartment according to claim 6, comprising a further cable cover for covering a cable portion extending on an inner face of the ledge side wall as far as the plug socket.

9. The overhead luggage compartment according to claim 7, wherein said lighting means is mounted in a handle.

* * * * *